J. B. MORRAY, dec'd.
J. B. & R. J. MORRAY, Executors.
BURIAL-CASE.
No. 177,741.          Patented May 23, 1876.
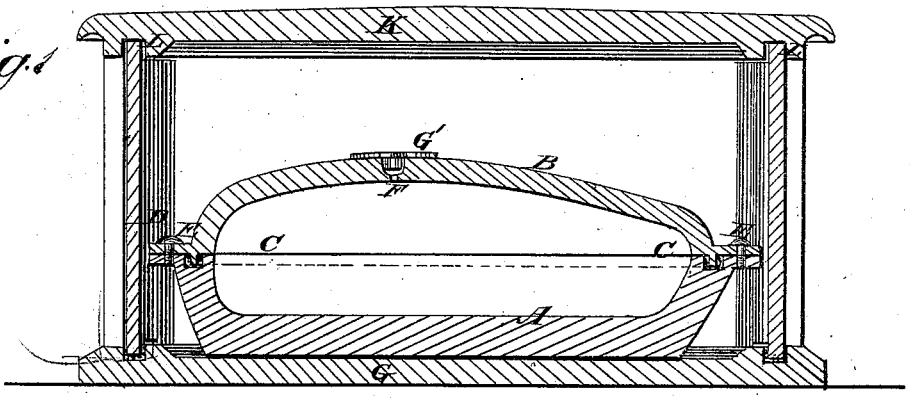
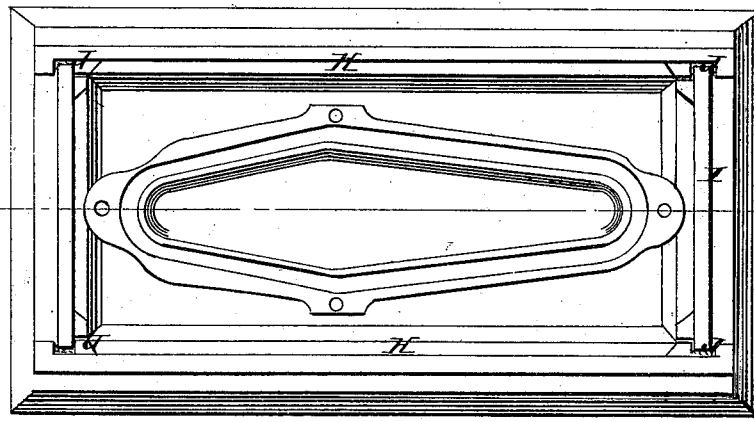
WITNESSES:
Francis McArdle,
John Goethals
INVENTOR:
J. B. Morray
R. J. Morray, Executors
of J. B. Morray, dec'd.
ATTORNEYS.

UNITED STATES PATENT OFFICE.

JOSEPH B. MORRAY AND ROBERT J. MORRAY, OF NEW BURNSIDE, ILLINOIS, EXECUTORS OF JAMES B. MORRAY, DECEASED.

IMPROVEMENT IN BURIAL-CASES.

Specification forming part of Letters Patent No. 177,741, dated May 23, 1876; application filed April 4, 1876.

To all whom it may concern:

Be it known that JAMES B. MORRAY, deceased, late of New Burnside, in the county of Johnston and State of Illinois, did invent a new and Improved Burial-Case, of which the following is a specification:

The invention consists of a burial-case the entire top portion of which is formed of glass and the lower part of cement, the two being hermetically joined by tongue-and-groove and cement joints; also flanges and bolts. The case is particularly designed for use within a monumental cement-case, which is set in the ground and provided with a removable top, by removing which the body of the deceased can be seen through the glass top of the inner case.

Figure 1 is a longitudinal sectional elevation of the improved burial-case, showing the same inclosed within a cement case. Fig. 2 is a top view, with the covers of both cases removed.

A is the lower cement part of the burial-case; B, the glass top of the same. The said parts are joined at C by cemented tongue-and-groove joints; also by flanges and bolts D and E. F is an opening in the top for pumping out the air, and G' a valve for closing it afterward, and to be cemented. G, H, I, and K indicate, respectively, the bottom, sides, ends, and top of the inclosing monumental case. Said sides and ends are grooved and cemented at J and L. The outer case is set in the ground, leaving the top exposed. The top is removable, so that the corpse may be seen at any time.

What is claimed is—

The improved burial-case made of bottom, cement portion A, and top glass portion B, which are connected by bolts, flanges, and tongue and groove, substantially as described.

JOSEPH B. MORRAY,
ROBERT J. MORRAY,
Executors of James B. Morray, deceased.

Witnesses:
J. A. SMITH,
F. M. JONES.